(12) United States Patent
Nguyen

(10) Patent No.: US 6,298,369 B1
(45) Date of Patent: Oct. 2, 2001

(54) HIGH SPEED MULTIPLIER

(75) Inventor: Thi N. Nguyen, Carrollton, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/164,027

(22) Filed: Sep. 30, 1998

(51) Int. Cl.[7] .................................................. G06F 7/52
(52) U.S. Cl. ............................................. 708/620; 708/625
(58) Field of Search ..................................... 708/490, 503, 708/620, 625, 628

(56) References Cited

U.S. PATENT DOCUMENTS

| | | | |
|---|---|---|---|
| 4,573,136 | * 2/1986 | Rossiter | 708/603 |
| 4,611,305 | 9/1986 | Iwase | 364/736 |
| 4,864,529 | 9/1989 | Shah et al. . | |
| 5,117,385 | * 5/1992 | Gee | 708/625 |
| 5,150,320 | 9/1992 | Nakayama | 364/748 |
| 5,255,216 | * 10/1993 | Blanz et al. | 708/625 |
| 5,260,898 | * 11/1993 | Richardson | 708/490 |
| 5,343,416 | 8/1994 | Eisig et al. . | |
| 5,715,187 | * 2/1998 | Chen et al. | 708/620 |
| 5,828,591 | 10/1998 | Rotstain . | |

FOREIGN PATENT DOCUMENTS 2 184 269   6/1987 (GB) .

\* cited by examiner

*Primary Examiner*—Chuong Dinh Ngo
(74) *Attorney, Agent, or Firm*—Theodore E. Galanthay; Lisa K. Jorgenson; William A. Munck

(57) ABSTRACT

The high speed multiplier takes advantage of results from previous calculations by recognizing that in many cases the multiplicand between a first and second multiplication differs only slightly. Thus, the present system divides the multiplicand into a cache lookup bit (CLB) and a table lookup bit (TLB). The results of a first multiplication are stored in a cache. The CLB of a of the multiplicand in the second multiplication is then compared to the CLB of the multiplicand in the second multiplication. If the CLB matches, the product of the first multiplication is retrieved. The product of the TLB of the multiplicand and the multiplier is then retrieved from a lookup table and either added or subtracted from the retrieved product.

17 Claims, 3 Drawing Sheets

3-TAP FIR FILTER
$Y_n = (X_n \times C_1) + (X_{n-1} \times C_2) + (X_{n-2} \times C_3)$

HIGH SPEED MULTIPLIER

BACKGROUND OF THE INVENTION

1. Technical Field

The present invention relates to a high speed multiplier and specifically to a high speed multiplier that utilizes cache memory searches for previous results. The multiplier would be well suited for various digital signal processing (DSP) applications,

2. Description of the Related Art

Besides addition, multiplication is a very heavily used core operation for signal processing. To achieve high throughput, fast multiplications are required. The multiplication of two unsigned numbers A and B creates the product P $$P=A*B$$

where A is called the multiplicand and B the multiplier. Given that A is an m-bit positive whole number and B is an n-bit positive whole number, then the numeric representation of the product P requires (m+n) bits.

In digital signal processing (DSP) system, there is always a demand for fast multiplication. For example, an N-tap with M-bit per tap FIR filter 100, shown in FIG. 1, requires N×M multiplications. A multiplicand $X_n$ 102 is multiplied by a first coefficient C1 106, while $X_{n-1}$ 112, the output of the $Z^{-1}$ operator, is multiplied by a second coefficient C2 108, and $X_{n-2}$ 114, the output from a second $Z^{-1}$ operator, is multiplied by a third coefficient C3 110. The results of each multiplication are summed 116 to produce the output value $Y_n$ 104.

For a real-time DSP application, the Nyquist theory dictates that the sampling rate of a system (Fs) is twice the bandwidth of the system (Fs=2F). Thus, higher system bandwidth requires faster multiplication operations. There are many hardware implementations of parallel multipliers. However, the basic design for each multiplier is an add and shift algorithm. This algorithm generates a partial product, using Booth's algorithm for example, and then adding a partial product using a ROM look up table. For a very basic implementation of the multiplier is consisting of a fast adder, multiplexer (mux) and shift register. An example of a 4×4 multiplier is following:

```
    0110        Multiplicand
  ×1010         Multiplier
  ─────
    0000
    0110
    0000
    0110
  ─────
  0111100 => 3 c hex or 60 decimal
```

Two registers 202, 204 are used to hold the value of the multiplier and the multiplicand as shown in FIG. 2. The multiplier register 202 is shifted into the control logic. If multiplier bit n is a zero, the multiplexer (mux) 216 will select a zero output. Otherwise the mux will select the multiplicand output. The shift register will shift the mux output to n−1 bit to the left. The adder 212 will add this with the partial register 210 that has the initial value of zero. After N iterations the adder 212 will output the final product 214 From the above example, there are N iterations for an N×N multiple. Thus, for a 30-bit by 30-bit multiplication, there would be 30 iterations. Likewise, for a 60×60 multiplication, there would be 60 iterations. A need exists to perform these multiplications with fewer iterations.

SUMMARY OF THE INVENTION

The present invention recognizes that in many circumstances, several multiplication operations are conducted as part of a sequence. The multiplier may be the same for each operation while the multiplicand differs only slightly. The method used to improve the speed of multiplication operations involves dividing the multiplicand into two portions. The first portion is referred to as a cache lookup bit (CLB), while the second portion is referred to as a table lookup bit (TLB). For example, a 30 bit multiplicand could be divided into a 24 bit CLB and a 6 bit TLB. Of course, the lengths of the CLB and TLB can be varied. When a first multiplication operation is performed, its result is stored in cache memory. When the second multiplication is performed, then the method first compares the CLB of the multiplicand with the previous multiplicand. If the CLB's match, also known as a cache hit, the output data from the cache will add/sub with a value pulled from the TLB RAM lookup for a final product. The RAM lookup table is simply a multiplication table. For example, if the TLB is 4 bits in length then the table will contain the results of values 0 to 16 multiplied with C1.

The decision to add or subtract is made from the comparison between the multiplicand TLB and cache TLB address bit. If the multiplicand TLB bit is smaller than the cache TLB address bit, then a subtract operation will be performed. If the TLB bit is equal to the cache TLB bit, then cache output is the final product. If it is bigger, then an add operation will be performed. If no cache hit occurs, also known as a cache miss, then a conventional multiplier will be used to perform the multiplication. The output data from the multiplier can still be used to update the cache and the final product.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE DRAWINGS

Figure 1:
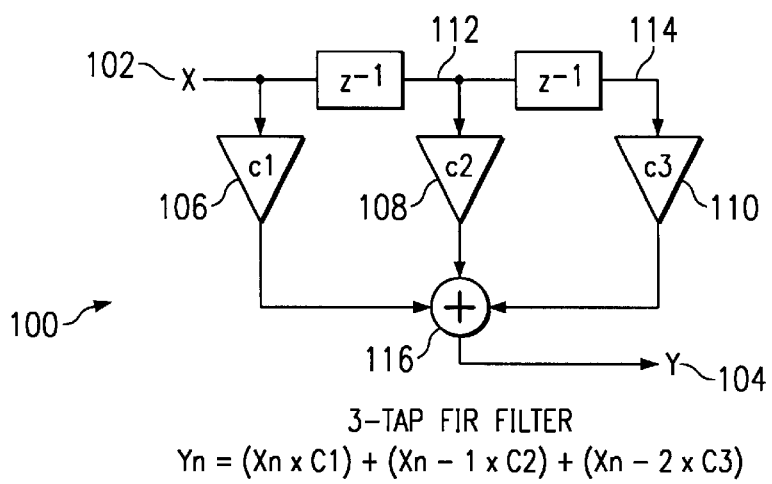
FIG. 1 illustrates a 3-Tap FIR Filter that would benefit from the present invention.
Figure 2:
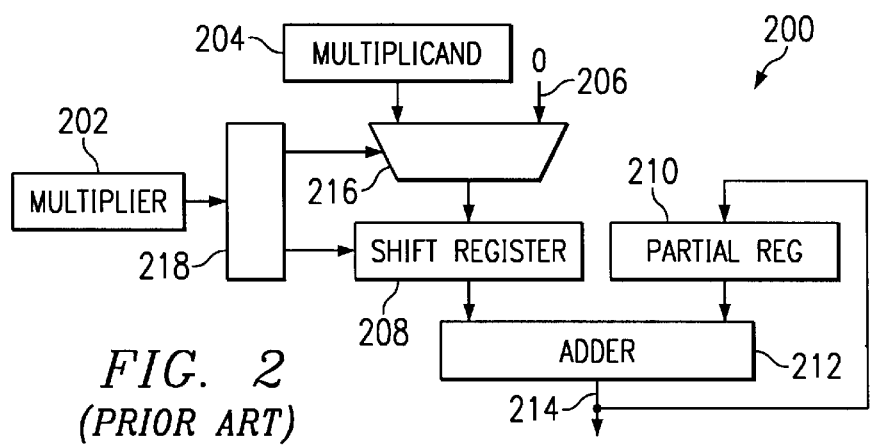
FIG. 2 illustrates a prior art shift-add multiplier design.
Figure 3:
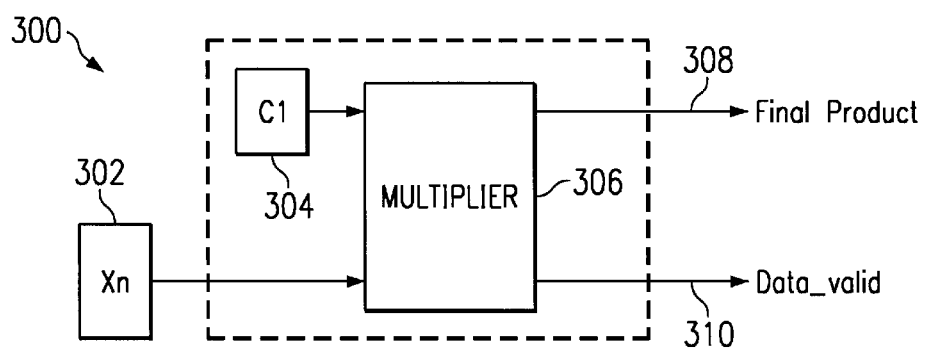
FIG. 3 is a block diagram of the present invention showing the multiplier and multiplicand undergoing a multiplication operation to yield a final product.

A higher speed multiplier is possible when one recognizes that many sequential multiplications can take advantage of the results of earlier multiplications saved in cache memory. In its most basic form, FIG. 3 illustrates the present invention. The high speed multiplier 300 utilizes a multiplier circuit 306. This multiplier circuit 306 operates on a multiplicand 302 and a multiplier 304. In this illustration, the multiplier is designated as a constant. The output is delivered on line 308. However, the output varies with each iteration during the multiplication. Thus, a data valid line 310 is also provided. The data valid line will show a distinct value, such as true, once the necessary number of iterations have occurred. Once this distinct value is detected, then the result on line 308 is the final product.

Figure 4:
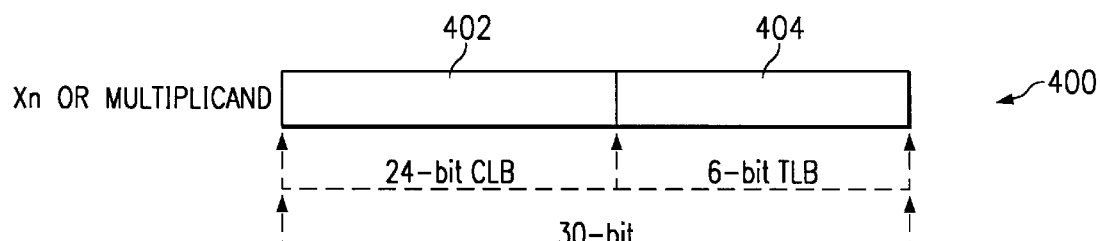
FIG. 4 provides one illustration of how a 30-bit multiplicand can be divided into a cache lookup bit (CLB) and a table lookup bit (TLB) portion.

FIG. 4 shows an example multiplicand 400 of 30-bit length. The multiplicand is divided into a cache lookup bit (CLB) portion 402 and a table lookup bit (TLB) portion 404. When sequential multiplicands are close in value, the CLB portion 402 will not change. More importantly, the CLB portion of the product will not change either. This fact allows for a reduction in the number of iterations required to reach the final product.

Figure 5A:
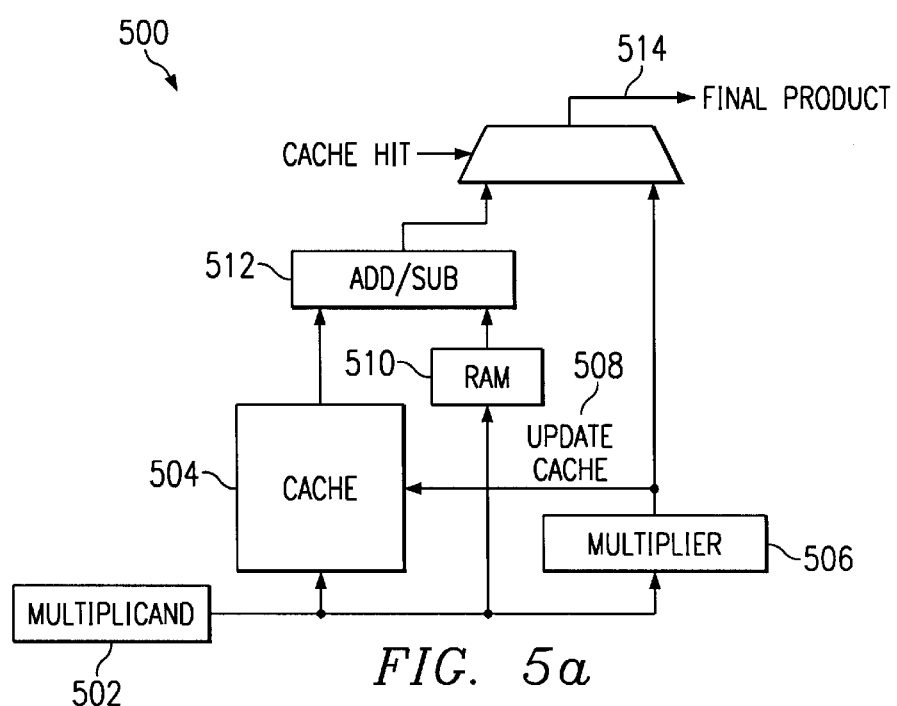
FIGS. 5a, 5b, and 5c illustrate the block logic and paths taken with a cache hit and a cache miss operation.

FIG. 5a illustrates a circuit that could be used to implement the method 500 of the present invention. As mentioned above, in most DSP multiplications, the CLB of the multiplicand 502 will show less variation than the TLB. Thus, the value of the CLB from a previous multiplication can be stored in high speed cache 504. Alternatively, it could be stored in a content addressable memory (CAM). For every multiplicand entered, the cache will be checked to see if the CLB of the multiplicand of the present multiplication is the same as the CLB of the previous operations multiplicand. A cache hit occurs when the CLBs match. If a cache hit occurs, the output data from the cache will add/sub 512 with the TLB RAM lookup 510 for a final product 514. The decision to add or sub is made from the comparison between the multiplicand TLB and cache TLB. If the multiplicand TLB is smaller than the cache TLB, then a subtract operation will be performed. If the multiplicand TLB is equal to the cache TLB, then cache output is the final product. If it is bigger, then an add operation will be performed. If no cache hit occurs, also known as a cache miss, then a conventional multiplier 506 will be used to perform the multiplication. The output data from the multiplier can still be used to update the cache and the final product.

The RAM lookup table 510 is simply a multiplication table. For example, if the TLB is 4 bits in length then the table will contain the results of values 0 to 16 multiplied with C1. For example, address 0 will contain the value of 0*C1, address 1 will contain the result of 1*C1 and so forth. If the TLB is 4-bit, there is 16×33 RAM, a respectively small amount of memory.

Figure 5B:
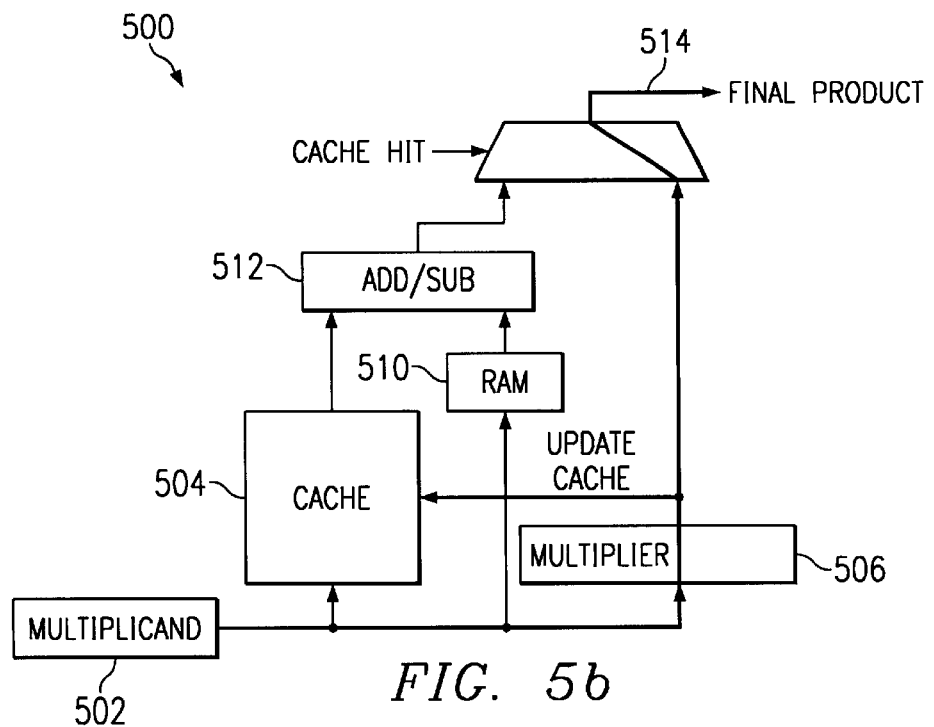
Figure 5C:
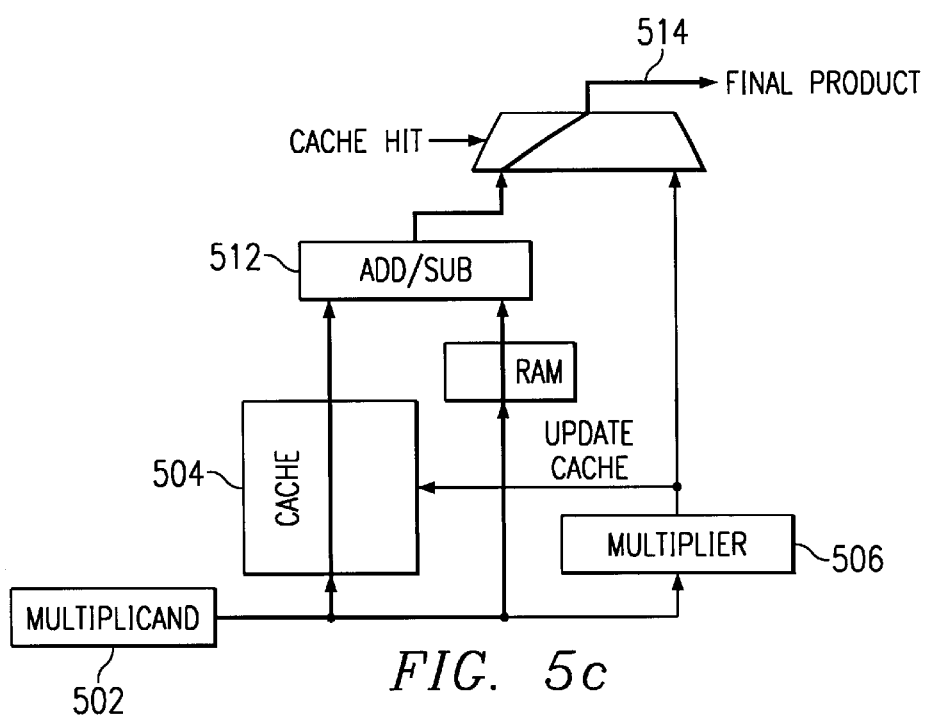

The following example demonstrates the steps involved with either a cache hit or a cache miss. First, define Xn=0× 0340h and C1=0×54h. The desired output is the value of Xn multiplied by C1. Note that the CLB is 0×034 and the TLB is 0×0. Assuming a cache miss, as shown in FIG. 5b, then the multiplier outputs the final product 0×11100. The cache is updated with address 0×0340, the CLB of the initial multiplicand, and data 0×11100. The next operation involves the multiplication of Xn=0×0342h and C1=0×54h. The CLB is 0×034 and the TLB is 0×2. In this instance, there is a cache hit. Cache output is 0×11100, the entry made above. The RAM look up using the TLB is 0×A8. The value retrieved from the RAM lookup table is based on the difference between the initial TLB and the subsequent TLB. Since multiplicand TLB=0×2 is bigger than the Cache TLB=0×0, the operator is add. Had the multiplicand TLB been smaller, the operator would be a subtract. Thus, the final product is 0×111000+0×A8=0×111A8.

In an alternate embodiment, the high speed multiplier is configured to eliminate the decision of either adding or subtracting the value from the RAM lookup table. Instead the system is biased to either always add or always subtract a value from the value retrieved from cache. For example, take the multiplication of 372 by 6 which equals 2232. The CLB can be the first two numbers of the multiplicand, i.e. 37, while the TLB is the last value, i.e. 2. If no cache hit occurs, a standard multiplier is used to produce the result. In one embodiment, a new value is formed with the existing CLB 37 and where all additional bits are set at zero, i.e. 370. Then the product of 370 and 6, i.e. 2220, is stored in cache. For the next multiplication, say 378 times 6, a cache hit occurs because the CLB 37 is present in both the present and previous multiplication. The product of 2220 is retrieved from cache. Further, the product of the TLB 8 and the constant 6, i.e. 48, is retrieved from the RAM lookup table and added to the retrieved value of 2220 producing a final value of 2268. When the values of the non-CLB bits are set to zero, the value from the RAM table is always added to the retrieved value. Alternatively, the value of the non-CBL bits can be set to 9 before the product is stored in cache. For example, the product of 372 times 6 would initially be stored as 379 times 6, i.e. 2274. The difference is then subtracted from 2274. In this situation, it is helpful to change the RAM table slightly. One could subtract the actual TLB 2 from the stored TLB 9 and then lookup the value of that difference, i.e. 7, times the constant 6 and then subtract that product, i.e 42, from the stored value of 2274 to obtain the final product of 2232. But one of these steps can be eliminated by simply different values in the RAM table. The original TLB of 2 is known. Therefore, its entry in the table could already be 42, i.e (9-TLB)*C. The entire table could be constructed using the basic formula of (9-TLB)*C. This example uses common arabic numbers. Of course, the system can be implemented with any number system. For example, if the TLB is 4-bits in length, the binary representation could be forced to either 0000 or 1111.

In summary, if every operation results in a cache hit, it might take 5 ns to generate the final product. If every cache miss takes 15 ns and there is a 80% cache hit rate, then the overall performance will be 7 ns per multiplier. This is a significant improvement over the standard multiplication rates. If the hit rate is as high at 95%, then the overall system performance 5.50 ns. With a 5.5 ns multiplier, a DSP system can support 100+MHz sampling rate.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

I claim:

1. A high speed multiplier for calculating the product of a variable N-bit multiplicand and an M-bit constant comprising:
   (a) a memory for storing a first multiplication result equal to a product of a first N-bit multiplicand and the M-bit constant, said memory further capable of retrieving the first multiplication result using a cache lookup bit (CLB) portion of a second N-bit multiplicand;
   (b) a lookup table circuit containing a plurality of sub-products, wherein a first sub-product is equal to a product of the M-bit constant and a first difference value, the first difference value associated with a difference between a first table lookup bit (TLB) portion of the first N-bit multiplicand and a second TLB portion of the second N-bit multiplicand; and (c) a summation circuit capable of adding the first sub-product to the first multiplication result to thereby produce a second multiplication result equal to a product of the M-bit constant and the second N-bit multiplicand.

2. The high speed multiplier of claim 1, wherein the summation circuit is further capable of subtracting the first sub-product from the first multiplication result to thereby produce the second multiplication result.

3. The high speed multiplier of claim 2 wherein the memory is a cache memory.

4. The high speed multiplier of claim 2 wherein the memory is a content addressable memory (CAM).

5. The high speed multiplier of claim 1 further comprising a conventional multiplier for use when the CLB portion of the second N-bit multiplicand does not match a CLB portion of the first N-bit multiplicand.

6. The high speed multiplier of claim 1 wherein the lookup table circuit comprises a random access memory (RAM).

7. A digital signal processor comprising:

a high speed multiplier for calculating the product of a variable N-bit multiplicand and an M-bit constant comprising:

(a) a memory for storing a first multiplication result equal to a product of a first N-bit multiplicand and the M-bit constant, said memory further capable of retrieving the first multiplication result using a cache lookup bit (CLB) portion of a second N-bit multiplicand;

(b) a lookup table circuit containing a plurality of sub-products, wherein a first sub-product is equal to a product of the M-bit constant and a first difference value, the first difference value associated with a difference between a first table lookup bit (TLB) portion of the first N-bit multiplicand and a second TLB portion of the second N-bit multiplicand; and (c) a summation circuit capable of adding the first sub-product to the first multiplication result to thereby produce a second multiplication result equal to a product of the M-bit constant and the second N-bit multiplicand.

8. The digital signal processor of claim 7, wherein the summation circuit is further capable of subtracting the first sub-product from the first multiplication result to thereby produce the second multiplication result.

9. The digital signal processor of claim 8 wherein the memory is a cache memory.

10. The digital signal processor of claim 8 wherein the memory is a content addressable memory (CAM).

11. The digital signal processor of claim 7 further comprising a conventional multiplier for use when the CLB portion of the second N-bit multiplicand does not match a CLB portion of the first N-bit multiplicand.

12. The digital signal processor of claim 7 wherein the lookup table circuit comprises a random access memory (RAM).

13. A method of calculating the product of a variable N-bit multiplicand and an M-bit constant comprising the steps of:

storing a first multiplication result equal to a product of a first N-bit multiplicand and the M-bit constant in a memory;

retrieving from the memory the first multiplication result using a cache lookup bit (CLB) portion of a second N-bit multiplicand;

retrieving from a lookup table circuit a first sub-product equal to a product of the M-bit constant and a first difference value, the first difference value associated with a difference between a first table lookup bit (TLB) portion of the first N-bit multiplicand and a second TLB portion of the second N-bit multiplicand; and adding the first sub-product to the first multiplication result to thereby produce a second multiplication result equal to a product of the M-bit constant and the second N-bit multiplicand.

14. The method of claim 13 further comprising the step of subtracting the first sub-product from the first multiplication result to thereby produce the second multiplication result.

15. The method of claim 14 wherein the memory is a cache memory.

16. The method of claim 14 wherein the memory is a content addressable memory (CAM).

17. The method of claim 13 wherein the lookup table circuit comprises a random access memory (RAM).

* * * * *